April 15, 1952    O. C. HOOVER ET AL    2,593,303
CUPOLA FURNACE
Filed Aug. 21, 1951
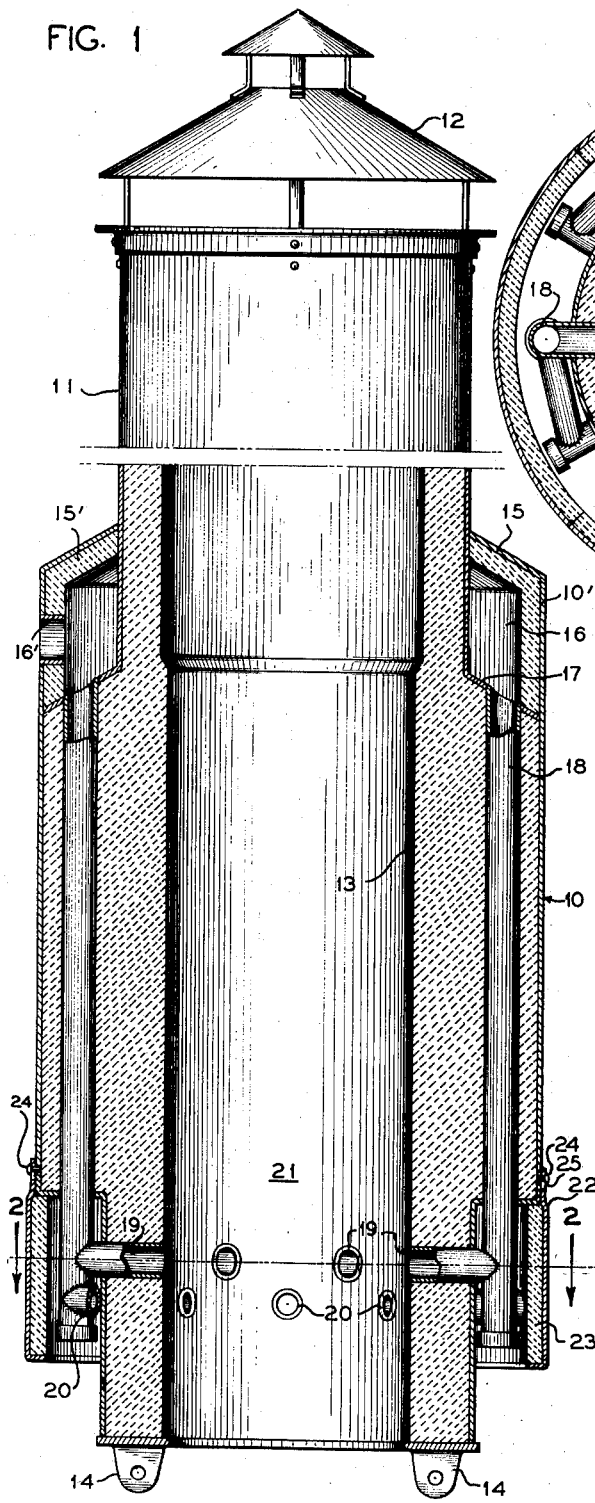
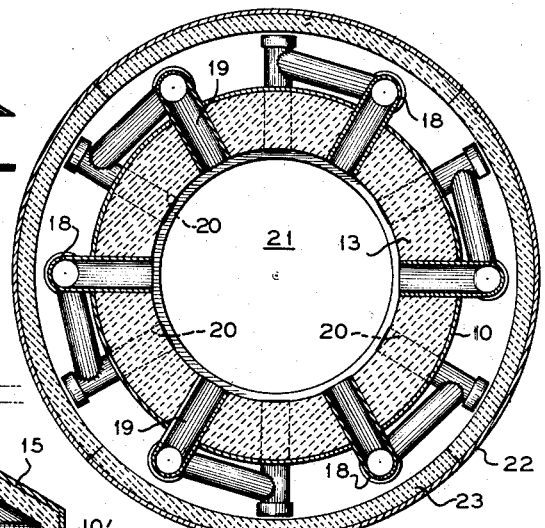
INVENTORS.
O. C. HOOVER
J. A. BOREN
BY
*A. Yates Dowell*
ATTORNEY Patented Apr. 15, 1952

2,593,303

UNITED STATES PATENT OFFICE 2,593,303

CUPOLA FURNACE

Orville C. Hoover and John A. Boren,
Greensboro, N. C.

Application August 21, 1951, Serial No. 242,864

3 Claims. (Cl. 266—30)

This invention relates to the production of metals and the equipment employed in such production. Specifically the invention is directed to a high efficiency shaft or cupola furnace.

In the production of metals various types of furnaces have been employed including the shaft or cupola type furnace in which it has been common practice to charge the same with alternate layers coke or the like fuel and iron usually of the pig or scrap variety or a combination thereof with air supplied in substantial volume through tuyères in the lower part of the furnace in order to provide the necessary oxygen for supporting combustion. The combined charge melts and collects in the bottom of the furnace and is drawn off in the usual manner through a tap hole. In these prior art devices the air supplied by the blower for supporting combustion has been obtained from the ambient atmosphere and consequently is relatively cold compared to the temperature within the furnace. This has resulted in extremely low efficiency for this type of furnace with a consequent necessity for using a relatively large quantity of coke in relation to the weight of iron melted.

It is therefore an object of this invention to provide a cupola furnace in which the air supplied to support combustion is pre-heated to increase the efficiency of such furnace.

Another object of the invention to provide a cupola furnace in which the air utilized to support combustion is pre-heated by the heat developed within the furnace, the structure making this possible being incorporated as an integral part of the furnace.

A further object of the invention to provide a cupola furnace in which the air utilized for supporting combustion is pre-heated and is conducted through ducts to the combustion chamber through the walls of the furnace in order to prevent undue cooling thereof and to further heat the same from the furnace walls.

Further objects and advantages of the invention will be apparent from the following description taken in conjunction with the accompanying drawings, wherein:

Fig. 1, is an elevational view with parts in section for greater clarity of a cupola furnace constructed in accordance with the present invention;

Fig. 2, a sectional view on the line 2—2 of Fig. 1; and

Fig. 3, a fragmentary elevational view showing the manner of securing the detachable insulation which is utilized to surround the tuyères.

With continued reference to the drawing there is illustrated in Fig. 1 a cupola furnace in accordance with the present invention, in which there is provided an external shell 10 extending from the bottom to a point well above the mid portion thereof, and an upper shell 11 which forms a stack for conducting the products of combustion, from the building in which the furnace is installed, to the atmosphere. The shell 11 is covered at the top by a hood 12 which prevents sparks from the furnace from being discharged and cause fires in the vicinity.

The shells 10 and 11 are lined on the inner surface thereof with a refractory material 13 in order to prevent burning of the metal or other material which forms the shells 10 and 11 by combustion in the interior of the furnace.

The lower end of the furnace is closed by doors not shown pivotally mounted on downwardly extending ears 14, these doors being provided for the purpose of permitting access to the furnace to repair the refractory lining 13 and to remove ashes, slag or other debris therefrom after completion of the pouring operation.

As will be seen from an inspection of Fig. 1, the shell 10 is of somewhat larger diameter than the shell 11, and extends upwardly being provided with an in-turned, angularly disposed flange 15 which extends inwardly and is secured to the shell 11 by welding or the like. Inwardly extending flange 15 provides an air chamber or wind box 16 therebelow between the shell 15 and an outwardly extending shoulder 17 formed by the refractory lining 13. The upper portion 10' of the shell 10 and the inwardly extending flange 15 which form the outer walls of the wind box 16 may be provided with a layer of insulation 15' in order to prevent undue escape of heat from the wind box. An air inlet in the form of an aperture 16' may be provided in wall 10' and insulation 15' in order to admit air to the wind box.

Communicating with the chamber or wind box 16, are a plurality of downwardly directed conduits 18, which extend through the refractory lining 13, within the shell 10 and serve to supply pre-heated air to tuyères 19 and 20 extending through the refractory lining 13 whereby such air is introduced to the combustion chamber 21. The tuyères are disposed at different levels in order to prevent bridging of the charge within the furnace.

Since it is sometimes necessary to have access to the tuyères 19 and 20, in order to repair damage thereto, and in order to reduce heat loss to a minimum, a shield in the form of a shell 22 is provided having a lining of refractory or insulating material 23. This shield may be formed in segments as clearly shown in Figs. 2 and 3 and is suspended from the shell 10 of the cupola furnace by means of pins or rivets 24 extending therefrom which are received in keyhole slots 25 provided in the upper end of the shell 22.

It is to be noted that the conduits 18 extending from the air chamber or wind box 16 downwardly to the tuyères 19 and 20 are completely enclosed within the refractory and insulating lining 13 and consequently, air flowing through these conduits 18 is not cooled by the ambient air but actually receives heat from the refractory lining 13 which in turn is heated by combustion of the coke in the combustion chamber 21. Likewise, the air is heated to a relatively high degree in the chamber or wind box 16 and the net result is to supply the combustion supported air through the tuyères 19 and 20, which is at a temperature considerably higher than ambient and which therefore considerably raises the efficiency of the furnace since were ambient air introduced to the combustion chamber 21, much of the heat developed therein would be lost in heating such air.

The efficiency of a furnace constructed in accordance with the instant invention has been found to be substantially greater than the efficiency of a cupola furnace constructed in accordance with the prior art and this increased efficiency appears to be due largely to the provision of pre-heated air to the combustion chamber.

Suggestions to introduce pre-heated air in metallurgical furnaces has been heretofore proposed, nevertheless the structure present in this invention which makes such pre-heating possible is adaptable to relatively small foundry installation and does not require expensive pre-heating ovens or other apparatus which has heretofore been used in blast furnace operations. By the above described invention there has been provided a relatively simple, economically constructed cupola furnace which, in actual tests, has shown extremely high efficiencies when compared with conventional cupolas and which may be constructed at little more than the cost of the normal cupola furnace.

It will be obvious to those skilled in the art that various changes may be made in the invention without departing from the spirit and scope thereof and therefore the invention is not limited by that which is shown in the drawings and described in the specification, but only as indicated in the appended claims.

What is claimed is:

1. A cupola furnace comprising a shell extending from the bottom to a point substantially above the midpoint thereof, a second shell of reduced diameter having a portion extending downwardly within said first shell in spaced relation thereto and extending upwardly above said first shell to form a stack, an inwardly extending flange adjacent the upper end of said first shell connected to said second shell, an outwardly extending flange adjacent the lower end of said second shell connected to said first shell whereby said flanges and the portions of said shells therebetween define an annular chamber providing a wind box, a layer of insulation adjacent the outer walls of said wind box, an air inlet to said wind box, a substantially continuous refractory lining on the inner surface of said first shell and extending upwardly into said second shell and below said outwardly extending flange to define a combustion chamber, tuyères extending through said first shell and said lining adjacent the lower end of said furnace, conduits connected to said tuyères and extending upwardly through said lining and said outwardly extending flange into communication with said wind box and a detachable insulating jacket enclosing the connection of said conduits and said tuyères whereby air will be heated in said wind box and be maintained heated during flow through said conduits to said tuyères by reason of the heat absorbed by the lining surrounding said conduits.

2. A cupola furnace comprising a shell extending from the bottom to a point substantially above the midpoint thereof, a second shell of reduced diameter having a portion extending downwardly within said first shell in spaced relation thereto and extending upwardly to form a stack, an inwardly extending flange adjacent the upper end of said first shell connected to said second shell, an outwardly extending flange adjacent the lower end of said second shell connected to said first shell whereby said flanges and the portions of said shells therebetween define an annular chamber providing a wind box, a layer of insulation adjacent the outer walls of said wind box, an air inlet to said wind box, a substantially continuous refractory lining on the inner surface of said first shell and extending upwardly into said second shell and below said outwardly extending flange to define a combustion chamber, tuyères extending through said first shell and said lining adjacent the lower end of said furnace and conduits connected to said tuyères and extending upwardly through said lining and said outwardly extending flange into communication with said wind box whereby air will be heated in said wind box and be maintained heated during flow through said conduits to said tuyères by reason of the heat absorbed by the lining surrounding said conduits.

3. A cupola furnace comprising a shell, a second shell of reduced diameter having a portion extending downwardly within said first shell in spaced relation thereto and extending upwardly to form a stack, an inwardly extending flange adjacent the upper end of said first shell connected to said second shell, an outwardly extending flange adjacent the lower end of said second shell connected to said first shell whereby said flanges and the portions of said shells therebetween define an annular chamber providing a wind box, a layer of insulation adjacent the outer walls of said wind box, an air inlet to said wind box, a substantially continuous refractory lining on the inner surface of said first shell and extending upwardly into said second shell and below said outwardly extending flange to define a combustion chamber, tuyères extending through said first shell and said lining adjacent the lower end of said furnace and conduits connected to said tuyères and extending upwardly through said lining and said outwardly extending flange into communication with said wind box, whereby air will be heated in said wind box and be maintained heated during flow through said conduits to said tuyères by reason of the heat absorbed by the lining surrounding said conduits.

ORVILLE C. HOOVER.
JOHN A. BOREN.

REFERENCES CITED

The following references are of record in the file of this patent:

UNITED STATES PATENTS

| Number | Name | Date |
|---|---|---|
| 324,623 | Whiting | Aug. 18, 1885 |
| 386,269 | Sahler | July 17, 1888 |
| 2,273,902 | Smalley et al. | Feb. 24, 1942 |
| 2,482,715 | Miller | Sept. 20, 1949 |

FOREIGN PATENTS

| Number | Country | Date |
|---|---|---|
| 589,101 | Great Britain | June 11, 1947 |